United States Patent
Sasaki et al.

(10) Patent No.: US 9,228,910 B2
(45) Date of Patent: Jan. 5, 2016

(54) ABNORMALITY DIAGNOSIS APPARATUS AND ABNORMALITY DIAGNOSIS METHOD FOR TORQUE SENSOR

(71) Applicant: KAYABA INDUSTRY CO., LTD., Minato-ku, Tokyo (JP)

(72) Inventors: Kazuhiro Sasaki, Gifu (JP); Hisazumi Ishikawa, Gifu (JP); Daisuke Nishio, Gifu (JP)

(73) Assignee: KAYABA INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/384,684

(22) PCT Filed: Mar. 5, 2013

(86) PCT No.: PCT/JP2013/055957
§ 371 (c)(1),
(2) Date: Sep. 11, 2014

(87) PCT Pub. No.: WO2013/137059
PCT Pub. Date: Sep. 19, 2013

(65) Prior Publication Data
US 2015/0046036 A1    Feb. 12, 2015

(30) Foreign Application Priority Data

Mar. 13, 2012 (JP) ................................. 2012-056388
Jan. 28, 2013 (JP) ................................. 2013-013160

(51) Int. Cl.
*G06F 7/00* (2006.01)
*G01L 3/10* (2006.01)
(Continued)

(52) U.S. Cl.
CPC ... *G01L 3/10* (2013.01); *B62D 5/04* (2013.01); *B62D 5/049* (2013.01); *G01L 5/221* (2013.01); *G01L 25/003* (2013.01)

(58) Field of Classification Search
CPC .... B62D 5/049; B62D 5/0481; B62D 5/0493; B62D 5/0484; G01L 3/04
USPC .......... 701/1, 29.6, 33.4, 36, 41, 42, 43, 102; 180/428, 443, 446, 404, 412; 73/862.321, 862.322, 862.33; 318/432, 318/434, 564; 361/23
See application file for complete search history.

(56) References Cited

U.S. PATENT DOCUMENTS 4,986,388 A * 1/1991 Matsuda ........................ 180/248
5,504,679 A * 4/1996 Wada et al. ..................... 701/41
(Continued)

FOREIGN PATENT DOCUMENTS

CN    1876467 A    12/2006
EP    0900711 A2    3/1999
(Continued)

OTHER PUBLICATIONS

International Search Report and Written Opinion mailed Apr. 16, 2013, corresponds to International application No. PCT/JP2013/055957.
(Continued)

*Primary Examiner* — Mcdieunel Marc
(74) *Attorney, Agent, or Firm* — Hauptman Ham, LLP

(57) ABSTRACT

An apparatus for diagnosing an abnormality in a torque sensor that is connected to a controller of an electric power steering apparatus by two systems includes a steering speed determination unit that determines whether a variation speed of a steering angle equals or exceeds a predetermined speed on the basis of a detection result from a steering angle sensor, an integrated value calculation unit that calculates an integrated value of an input torque detected by the torque sensor within a sampling period extending from a point at which a steering wheel is steered at or above the predetermined speed to a point at which the steering wheel returns to a neutral position, and an abnormality determination unit that determines that an abnormality has occurred in the torque sensor when the integrated value of the input torque is equal to or smaller than a predetermined reference integrated torque.

9 Claims, 6 Drawing Sheets

(51) Int. Cl.
 *B62D 5/04* (2006.01)
 *G01L 25/00* (2006.01)
 *G01L 5/22* (2006.01)

(56) References Cited

U.S. PATENT DOCUMENTS

| | | | |
|---|---|---|---|
| 6,240,349 | B1 | 5/2001 | Nishimoto et al. |
| 6,459,972 | B2 * | 10/2002 | Kodaka et al. ................. 701/43 |
| 7,363,136 | B2 * | 4/2008 | Kumaido et al. ............... 701/43 |
| 2001/0053952 | A1 * | 12/2001 | Kodaka et al. ................. 701/43 |
| 2006/0278467 | A1 | 12/2006 | Endo et al. |
| 2006/0282565 | A1 * | 12/2006 | Kumaido et al. ............... 710/41 |
| 2008/0006469 | A1 * | 1/2008 | Sasaki et al. ................. 180/428 |
| 2014/0102219 | A1 * | 4/2014 | Kuwahara et al. ....... 73/862.333 |
| 2014/0195117 | A1 * | 7/2014 | Kuwahara et al. ............. 701/41 |
| 2015/0046039 | A1 * | 2/2015 | Yamano et al. ................ 701/41 |

FOREIGN PATENT DOCUMENTS

| | | |
|---|---|---|
| EP | 1279586 A2 | 1/2003 |
| EP | 1752359 A1 | 2/2007 |
| JP | 3227770 A | 10/1991 |
| JP | 6135340 A | 5/1994 |
| JP | 1178921 A | 3/1999 |
| JP | 2000128003 A | 5/2000 |
| JP | 2006248354 A | 9/2006 |
| JP | 2007-216899 A | 8/2007 |
| JP | 200862686 A | 3/2008 |

OTHER PUBLICATIONS

Office Action issued May 27, 2015, corresponding to Chinese patent application No. 201380014118.3.
Extended European Search Report dated Oct. 8, 2015, corresponding to European patent application No. 13760901.2.

* cited by examiner

ABNORMALITY DIAGNOSIS APPARATUS AND ABNORMALITY DIAGNOSIS METHOD FOR TORQUE SENSOR

TECHNICAL FIELD

The present invention relates to an abnormality diagnosis apparatus and an abnormality diagnosis method for a torque sensor used in an electric power steering apparatus.

BACKGROUND ART

A conventional electric power steering apparatus assists a steering force applied by a driver to a steering wheel by detecting an input torque applied to a steering shaft using a torque sensor, and controlling driving of an electric motor on the basis of a detection result.

In this type of electric power steering apparatus, two torque sensor systems are provided, and when a difference of at least a predetermined value appears between output values of the two torque sensor systems, it is determined that a breakdown has occurred in the torque sensor.

In an apparatus provided with two torque sensor systems, however, when both systems are disconnected, the output values of the two torque sensor systems both correspond to a neutral point in which no steering torque is input, and therefore, with the above method of determining a breakdown on the basis of the difference between the output values of the two systems, it is impossible to determine that a breakdown has occurred in both torque sensor systems. In this type of situation, the output value of the torque sensor corresponds to the neutral point in which no steering torque is input even when the driver operates the steering wheel such that steering torque is generated in the steering shaft, and therefore assistance is not provided by the electric motor. As a result, the steering wheel becomes heavy.

JP2008-62686A discloses an electric power steering control apparatus that determines that an abnormality has occurred in a torque sensor when a condition in which two output values obtained from a torque sensor are in the vicinity of a reference value and a steering angle of a steering wheel equals or exceeds a predetermined angle remains established for a predetermined time.

SUMMARY OF INVENTION

In the electric power steering control apparatus described in JP2008-62686A, one of the determination conditions is that the steering angle of the steering wheel remains at or above the predetermined angle continuously for the predetermined time. In a case where the steering wheel is operated while the vehicle is stationary and the vehicle remains stationary for a long time with the steering angle at or above the predetermined angle, however, no steering torque is input into the torque sensor for a fixed time despite the fact that the steering angle of the steering wheel equals or exceeds the predetermined angle, and therefore an abnormality may be determined erroneously even though no problems have occurred in the torque sensor.

An object of the present invention is to diagnose an abnormality in a torque sensor with a high degree of precision.

According to one aspect of present invention, an abnormality diagnosis apparatus for diagnosing an abnormality in a torque sensor that is connected to a controller of an electric power steering apparatus by two systems is provided. The abnormality diagnosis apparatus includes a steering speed determination unit that determines whether or not a variation speed of a steering angle of a steering wheel equals or exceeds a predetermined speed on the basis of a detection result from a steering angle sensor that detects the steering angle of the steering wheel, an integrated value calculation unit that calculates an integrated value of an input torque detected by the torque sensor within a sampling period extending from a point at which the steering wheel is steered at or above the predetermined speed to a point at which the steering wheel returns to a neutral position, and an abnormality determination unit that determines that an abnormality has occurred in the torque sensor when the integrated value of the input torque, calculated by the integrated value calculation unit, is equal to or smaller than a predetermined reference integrated torque.

Embodiments of the present invention and advantages thereof are described in detail below with reference to the accompanying drawings.

DESCRIPTION OF EMBODIMENTS

Embodiments of the present invention will be described below with reference to the figures.

[First Embodiment]

Figure 1:
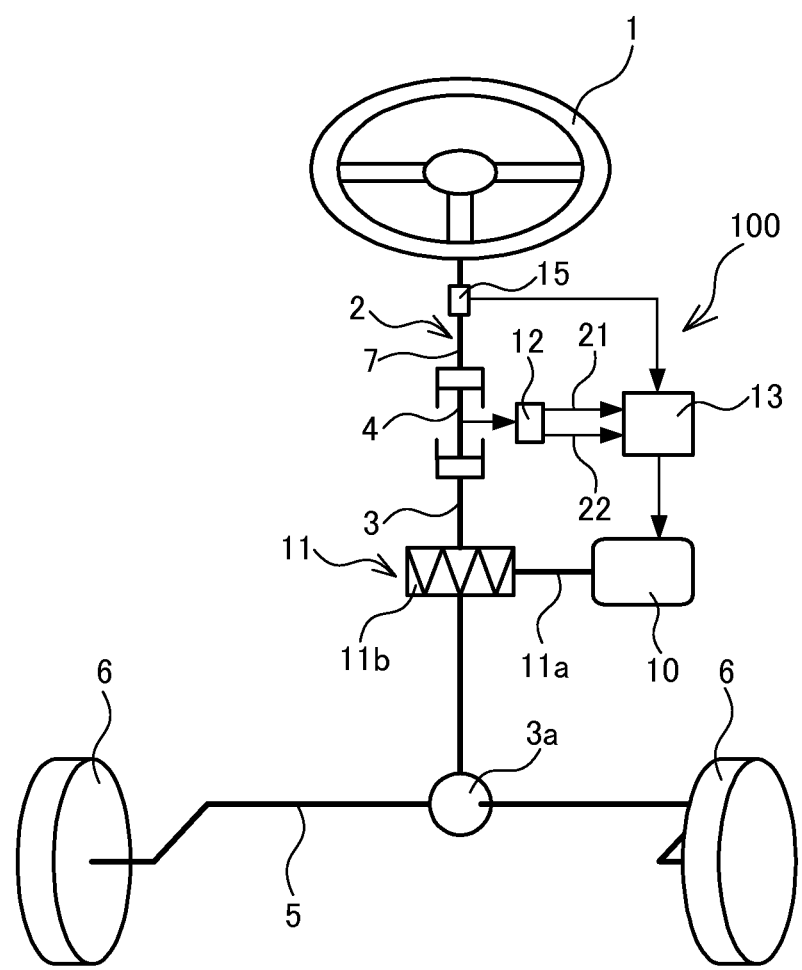
FIG. 1 is a view showing a configuration of an electric power steering apparatus to which an abnormality diagnosis apparatus for a torque sensor according to an embodiment of the present invention is applied.

First, referring to FIG. 1, an electric power steering apparatus 100 to which an abnormality diagnosis apparatus for a torque sensor according to a first embodiment of the present invention is applied will be described.

The electric power steering apparatus 100 includes an input shaft 7 that rotates in response to an operation of a steering wheel 1 by a driver, and an output shaft 3, an upper end of which is connected to the input shaft 7 via a torsion bar 4 and a lower end of which is linked to a rack shaft 5. The electric power steering apparatus 100 steers a vehicle wheel 6 by moving the rack shaft 5, which meshes with a pinion 3a provided on a lower end of the output shaft 3, in an axial direction. A steering shaft 2 is constituted by the input shaft 7 and the output shaft 3.

The electric power steering apparatus 100 further includes an electric motor 10 serving as a power source that assists steering of the steering wheel 1 by the driver, a reduction gear 11 that reduces the rotation of the electric motor 10 in speed and transmits the reduced-speed rotation to the steering shaft 2, a torque sensor 12 that detects an input torque applied to the torsion bar 4 in accordance with relative rotation between the input shaft 7 and the output shaft 3, and a controller 13 that controls driving of the electric motor 10 on the basis of a detection result from the torque sensor 12.

The reduction gear 11 is constituted by a worm shaft 11a coupled to an output shaft of the electric motor 10, and a worm wheel 11b that is coupled to the output shaft 3 and meshes with the worm shaft 11a. Torque output by the electric motor 10 is transmitted from the worm shaft 11a to the worm wheel 11b and applied to the output shaft 3 as assist torque.

The input torque (steering torque) applied to the steering shaft 2 is detected by the torque sensor 12, whereupon the torque sensor 12 outputs a voltage signal corresponding to the input torque to the controller 13. The controller 13 calculates the torque to be output by the electric motor 10 on the basis of the voltage signal from the torque sensor 12, and controls driving of the electric motor 10 so that the torque is generated. Hence, the electric power steering apparatus 100 assists a steering force exerted on the steering wheel 1 by the driver by detecting the input torque applied to the steering shaft 2 using the torque sensor 12, and controlling driving of the electric motor 10 using the controller 13 on the basis of the detection result.

A steering angle sensor 15 that detects a steering angle (an absolute steering angle) of the steering wheel 1 is provided on the steering shaft 2. An absolute rotation angle of the steering shaft 2 and the absolute steering angle of the steering wheel 1 are equal, and therefore, by detecting the rotation angle of the steering shaft 2 using the steering angle sensor 15, the steering angle of the steering wheel is obtained. A detection result from the steering angle sensor 15 is output to the controller 13. When the steering wheel 1 is in a neutral position, the steering angle sensor 15 outputs zero degrees as the steering angle. Further, when the steering wheel 1 is steered in a rightward turning direction from the neutral position, a steering angle having a + symbol is output in accordance with the rotation of the steering wheel 1, and when the steering wheel 1 is steered in a leftward turning direction from the neutral position, a steering angle having a − symbol is output in accordance with the rotation of the steering wheel 1.

The torque sensor 12 is connected to the controller 13 by two systems, namely a main system and a sub-system. In other words, the torque sensor 12 and the controller 13 are connected by two cables, namely a first cable 21 of the main system and a second cable 22 of the sub-system. The first cable 21 and the second cable 22 are respectively connected to the controller 13 via connectors.

The controller 13 includes a CPU that controls an operation of the electric motor 10, a ROM storing control programs, set values, and the like required for processing operations performed by the CPU, and a RAM that temporarily stores information detected by various sensors such as the torque sensor 12 and the steering angle sensor 15.

Figure 2:
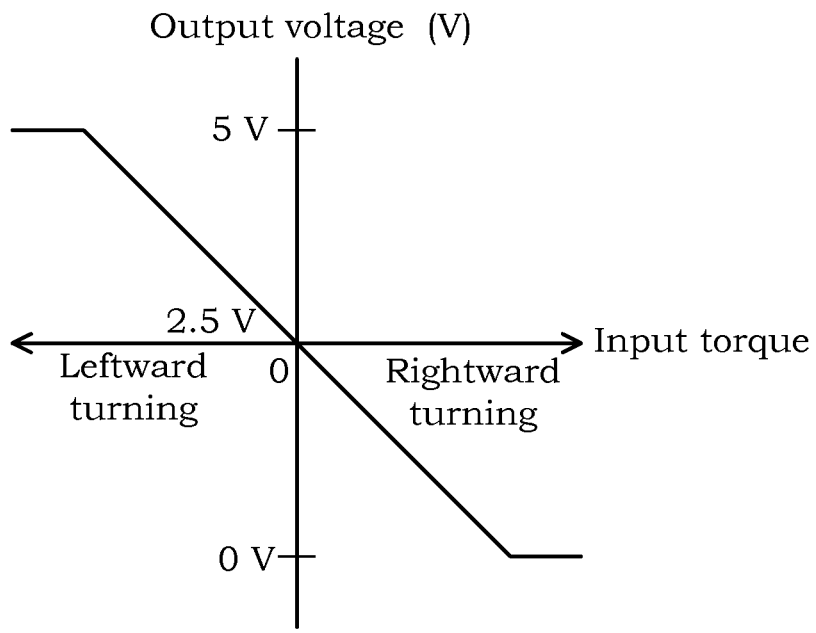
FIG. 2 is a characteristic view of a main system of a torque sensor, showing a relationship between an input torque applied to a steering shaft and an output voltage of the torque sensor.
Figure 3:
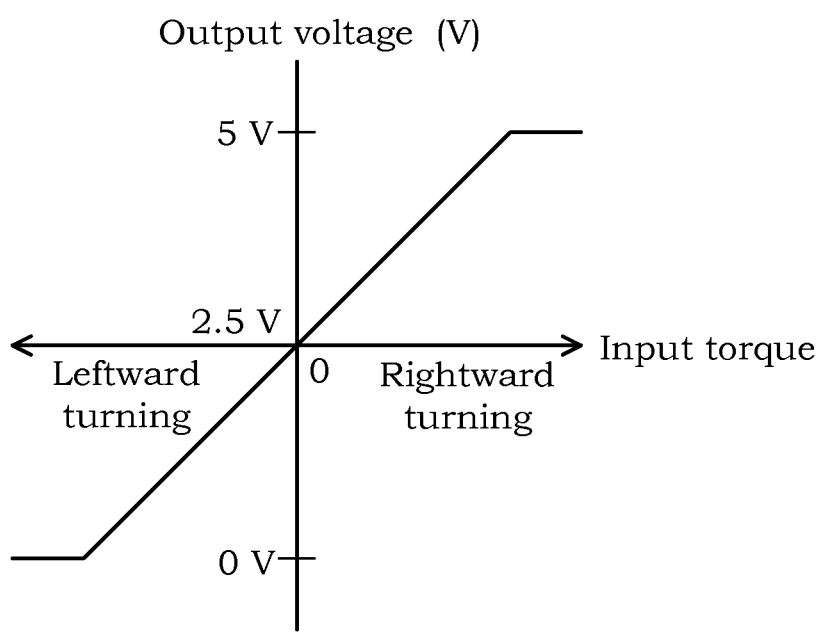
FIG. 3 is a characteristic view of a sub-system of the torque sensor, showing the relationship between the input torque applied to the steering shaft and the output voltage of the torque sensor.

FIG. 2 is a diagram showing an output characteristic of the main system of the torque sensor 12, and FIG. 3 is a diagram showing an output characteristic of the sub-system of the torque sensor 12. Both output characteristic diagrams show a relationship between the input torque applied to the steering shaft 2 and the output voltage of the torque sensor 12.

As shown in FIG. 2, according to the output characteristic of the main system, when the steering wheel 1 is not steered such that the input torque applied to the steering shaft 2 is zero, the output voltage is 2.5 V, which is an intermediate value of an output range. Further, when the steering wheel 1 is steered in the rightward turning direction from the neutral position, the output voltage decreases from 2.5 V to 0 V as the input torque increases, and when the steering wheel 1 is steered in the leftward turning direction from the neutral position, the output voltage increases from 2.5 V to 5 V as the input torque increases.

As shown in FIG. 3, according to the output characteristic of the sub-system, when the steering wheel 1 is not steered such that the input torque applied to the steering shaft 2 is zero, the output voltage is 2.5 V, i.e. the intermediate value of the output range, similarly to the main system. Further, when the steering wheel 1 is steered in the rightward turning direction from the neutral position, the output voltage increases from 2.5 V to 5.0 V as the input torque increases, and when the steering wheel 1 is steered in the leftward turning direction from the neutral position, the output voltage decreases from 2.5 V to 0 V as the input torque increases.

The output voltage output from the main system of the torque sensor 12 is used by the controller 13 to control the electric motor 10. The output voltage output from the sub-system is used to diagnose an abnormality in the torque sensor 12, but not used to control the electric motor 10. More specifically, the controller 13 compares the output voltage output from the main system with the output voltage output from the sub-system, and determines that an abnormality has occurred in the torque sensor 12 when a difference therebetween equals or exceeds a predetermined allowable difference.

Here, the torque sensor 12 is constituted by a circuit that outputs an output voltage of 2.5 V, which corresponds to an input torque of zero, when the first and second cables 21, 22 are disconnected or connectors of the first and second cables 21, 22 are detached. Hence, when the first and second cables 21, 22 are both disconnected or the connectors of the first and second cables 21, 22 are both detached, the output voltages of the main system and the sub-system are identical, and therefore the controller 13 determines that the difference between the output voltage output from the main system and the output voltage output from the sub-system is smaller than the allowable difference. Accordingly, the controller 13 cannot determine that an abnormality has occurred in the torque sensor 12.

Figure 4:
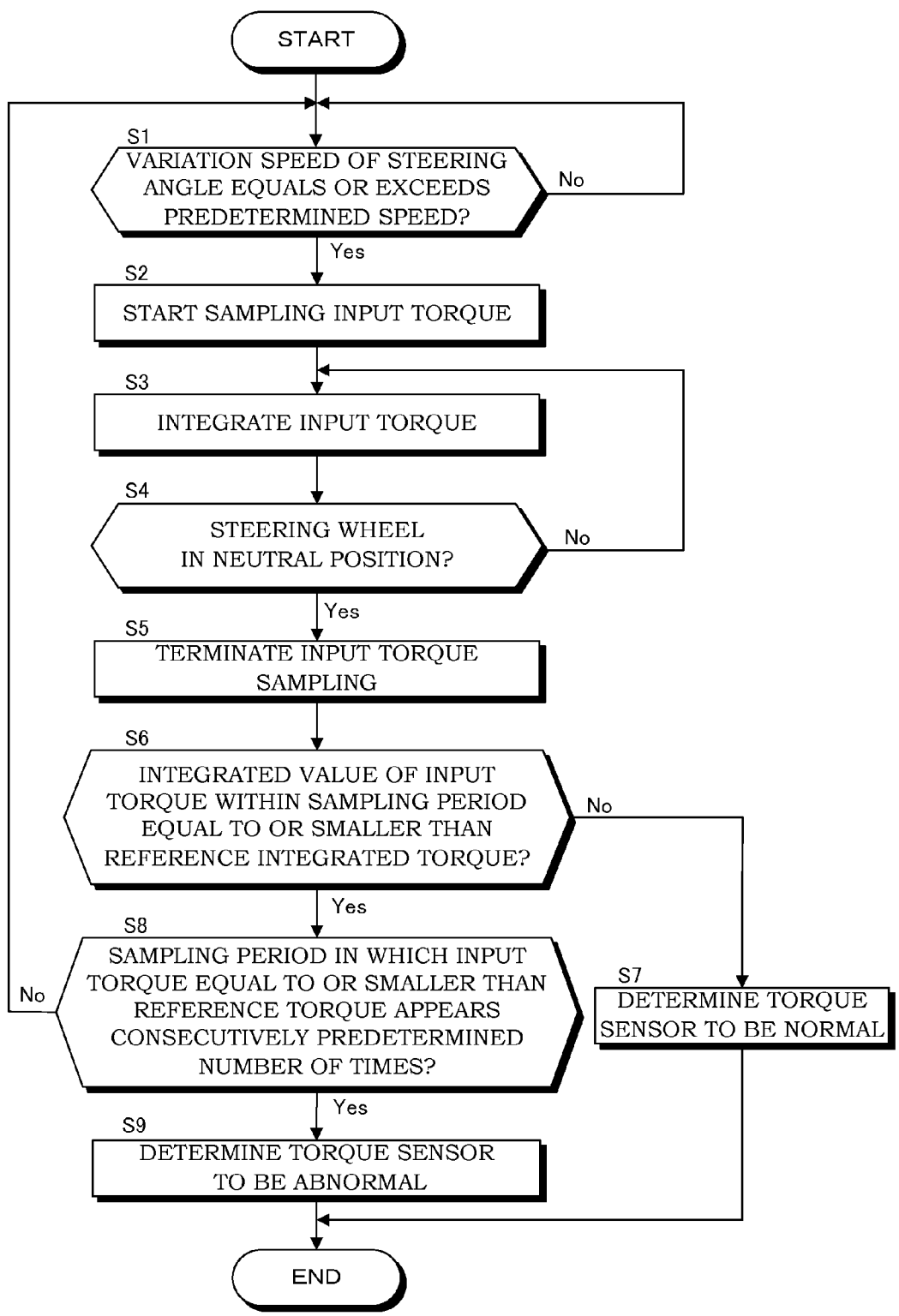
FIG. 4 is a flowchart showing procedures executed by a controller to determine an abnormality in the torque sensor according to a first embodiment.
Figure 5:
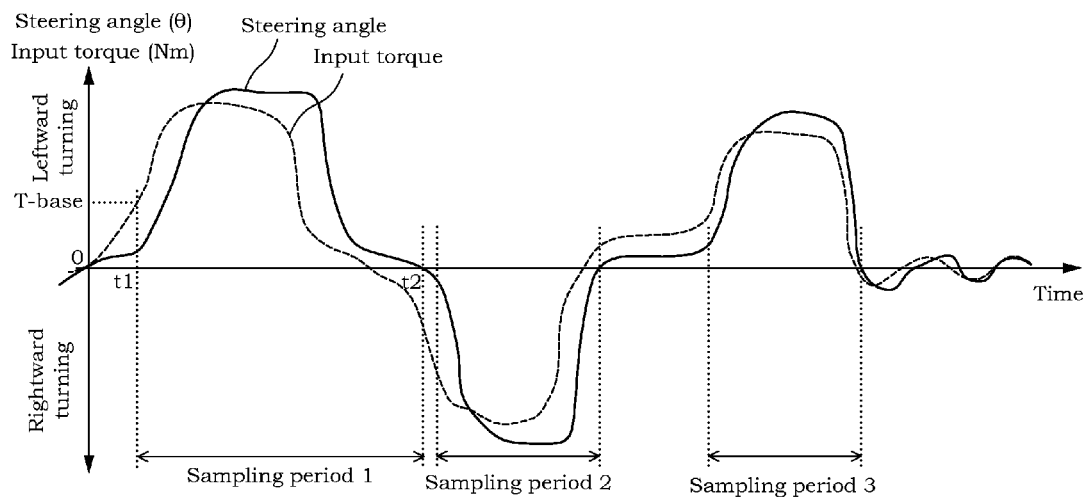
FIG. 5 is a graph showing temporal variation in a steering angle of a steering wheel, detected by a steering angle sensor, and the input torque applied to the steering shaft, detected by the torque sensor.

In this embodiment, however, it is possible to determine that an abnormality has occurred in the torque sensor 12 using a method to be described below even when abnormalities occur in both the main system and the sub-system. Referring to FIGS. 4 and 5, the method will now be described. FIG. 4 is a flowchart showing procedures executed by the controller 13 to determine the presence of an abnormality in the torque sensor 12. FIG. 5 is a graph showing temporal variation in the steering angle of the steering wheel 1, detected by the steering angle sensor 15, and the input torque input into the steering shaft 2, detected by the main system of the torque sensor 12. In FIG. 5, the steering angle is shown by a solid line and the input torque is shown by a dotted line.

Referring to FIGS. 4 and 5, the procedures executed by the controller 13 to determine the presence of an abnormality in the torque sensor 12 will be described.

In a step 1, a determination is made as to whether or not an amount of variation in the steering angle of the steering wheel 1 over a fixed time, which is detected by the steering angle sensor 15, or in other words a variation speed of the steering angle, equals or exceeds a predetermined speed. When it is determined that the variation speed of the steering angle of the steering wheel 1 equals or exceeds the predetermined speed, the routine advances to a step 2. The step 1 corresponds to a steering speed determination step executed by a steering speed determination unit of the controller 13.

In the step 2, sampling of the input torque based on the detection results of the torque sensor 12 is started (a time t1 in FIG. 5).

In a step 3, the sampled input torque is integrated. More specifically, the input torque is integrated by integrating a function thereof.

In a step 4, a determination is made on the basis of the detection result of the steering angle sensor 15 as to whether or not the steering wheel 1 is in the neutral position. More specifically, when the steering angle output by the steering angle sensor 15 is zero degrees, it is determined that the steering wheel 1 is in the neutral position. Alternatively, it may be determined that the steering wheel 1 is in the neutral position when a symbol of the steering angle output by the steering angle sensor 15 changes. When the steering wheel 1 straddles the neutral position (a point at which the steering angle reaches zero degrees), the symbol of the steering angle output by the steering angle sensor 15 changes from + to − or from − to +. It is therefore also possible to determine that the steering angle 1 is in the neutral position in response to a change in the symbol of the steering angle. When it is determined in the step 4 that the steering wheel 1 is not in the neutral position, the routine returns to the step 3, where integration of the input torque is continued.

When it is determined in the step 4 that the steering wheel 1 is in the neutral position, the routine advances to a step 5, where sampling of the input torque is terminated (a time t2 in FIG. 5). The steps 2 to 5 correspond to an integrated value calculation step executed by an integrated value calculation unit of the controller 13.

In a step 6, a determination is made as to whether or not an integrated value of the input torque within a sampling period (a period from the time t1 to the time t2 in FIG. 5) extending from a point at which the steering wheel 1 is steered at or above the predetermined speed to a point at which the steering wheel 1 returns to the neutral position is equal to or smaller than a predetermined reference integrated torque.

When it is determined in the step 6 that the integrated value of the input torque is equal to or smaller than the reference integrated torque, this indicates an abnormal condition in which the input torque input into the steering shaft 2 cannot be detected even though the driver is steering the steering wheel 1, and accordingly, the routine advances to a step 8. In this condition, assistance is not provided by the electric motor 10, and as a result, the steering wheel 1 becomes heavy.

When, on the other hand, it is determined in the step 6 that the integrated value of the input torque exceeds the reference integrated torque, this indicates a normal condition in which the input torque input into the steering shaft 2 can be detected, and accordingly, the routine advances to a step 7, where the torque sensor 12 is determined to be normal. An input torque curve shown in FIG. 5 indicates the normal condition in which the input torque input into the steering shaft 2 can be detected. In an abnormal condition such as when the first cable 21 of the main system of the torque sensor 12 is disconnected, on the other hand, the output voltage of the main system reaches 2.5 V and the input torque indicates zero even though the driver is steering the steering wheel 1.

The reference integrated torque serving as the reference value of the input torque used in the determination of the step 6 is set at a value at which an abnormality in the torque sensor 12 can be determined. For example, a larger value than a minimum torque that must be generated by the electric motor 10 to assist the steering force exerted on the steering wheel 1 by the driver, or the like, may be employed as the reference value.

In the step 8, a determination is made as to whether or not a sampling period in which a sum of the input torque is equal to or smaller than the reference integrated torque has appeared consecutively a predetermined number of times. When it is determined that the sampling period has not appeared consecutively the predetermined number of times, the routine returns to the step 1. When it is determined that the sampling period has appeared consecutively the predetermined number of times, on the other hand, the routine advances to a step 9. More specifically, the routine advances to the step 9 when a sampling period in which the integrated value of the input torque is equal to or smaller than the reference integrated torque appears consecutively a plurality of times, as in consecutive sampling periods 1, 2, 3, . . . shown in FIG. 5.

In the step 9, it is determined that an abnormality has occurred in the torque sensor 12, and abnormality diagnosis information relating to the torque sensor 12 is recorded in an abnormality history of the controller 13. More specifically, information indicating that an abnormality has occurred in both the main system and the sub-system of the torque sensor 12 is recorded in the ROM of the controller 13. Hence, by viewing the abnormality history of the controller 13, it can be learned that the reason why the steering wheel 1 has become heavy is that an abnormality has occurred in both the main system and the sub-system of the torque sensor 12, and measures can be taken swiftly to correct defects such as disconnection of the first and second cables 21, 22 and detachment of the connectors thereof. The steps 6, 8, and 9 correspond to an abnormality determination step executed by an abnormality determination unit of the controller 13.

In the step 8, the condition for determining an abnormality in the torque sensor 12 is that a sampling period in which the integrated value of the input torque is equal to or smaller than the reference integrated torque appear consecutively a plurality of times. However, an abnormality may be determined to have occurred in the torque sensor 12 when the sampling period in which the integrated value of the input torque is equal to or smaller than the reference integrated torque appears once. It should be noted, however, that in this case, an abnormality in the torque sensor 12 may be determined erroneously, and therefore, to improve the determination precision, an abnormality is preferably determined on condition that the sampling period appears consecutively a plurality of times.

The abnormality diagnosis described above is performed on the torque sensor 12 separately to the abnormality diagnosis in which the difference between the input torque detected by the main system and the input torque detected by the sub-system is monitored and an abnormality is determined to have occurred in the torque sensor 12 when the difference is determined to equal or exceed the allowable difference. When an abnormality occurs in the main system alone, the difference between the respective input torques of the main system and the sub-system equals or exceeds the allowable difference, and therefore this abnormality can be determined by monitoring the difference between the input torques of the two systems. When an abnormality occurs in both the main system and the sub-system, however, the presence of the abnormality cannot be determined by monitoring the difference between the input torques of the two systems. In this case, it can be determined that an abnormality has occurred in both the main system and the sub-system using the abnormality diagnosis of the steps 1 to 9, described above.

A case in which an abnormality diagnosis is performed on the torque sensor 12 by monitoring the input torque of the main system was described above. However, an abnormality diagnosis may be performed on the torque sensor 12 by monitoring the input torque of the sub-system, and an abnormality diagnosis may also be performed on the torque sensor 12 by monitoring the input torque of both the main system and the sub-system.

Figure 6:
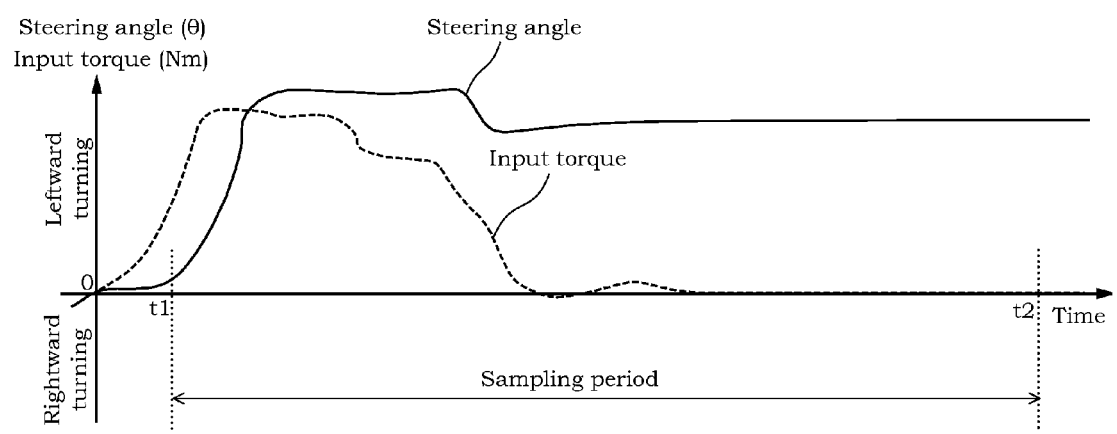
FIG. 6 is a graph showing temporal variation in the steering angle of the steering wheel, detected by the steering angle sensor, and the input torque applied to the steering shaft, detected by the torque sensor.

Here, when the vehicle is left for a long time without steering the steering wheel 1 back to the neutral position, sampling of the input torque in the procedures shown in FIG. 4 is not completed, and therefore the routine cannot advance to the step 6. As shown in FIG. 6, when the steering wheel 1 is not returned to the neutral position after the elapse of a predetermined time, sampling is completed at an end point (t2) of the predetermined time. When the integrated value of the input torque in a sampling period (a period from a time t1 to a time t2 in FIG. 6) extending from a point at which the steering wheel 1 is steered at or above the predetermined speed to a point at which the predetermined time elapses is equal to or smaller than a predetermined reference integrated torque, it is determined that an abnormality has occurred in the torque sensor 12.

When the torque sensor 12 is in the normal condition in a case where the vehicle is left for a long time without steering the steering wheel 1 back to the neutral position, as shown in FIG. 6, the input torque should be detected in the sampling period, and therefore an abnormality in the torque sensor 12 can also be determined using this method.

According to the first embodiment described above, following actions and effects are obtained.

The abnormality diagnosis apparatus according to the first embodiment determines that an abnormality has occurred in the torque sensor 12 when the integrated value of the input torque within the sampling period extending from the point at which the steering wheel 1 is steered at or above the predetermined speed to the point at which the steering wheel 1 returns to the neutral position is equal to or smaller than the reference integrated torque, and is therefore capable of determining whether or not an abnormality has occurred in both the main system and the sub-system of the torque sensor 12 with a high degree of precision.

[Second Embodiment]

Next, referring to FIG. 7, an abnormality diagnosis apparatus for a torque sensor according to a second embodiment of the present invention will be described. Differences with the first embodiment will be described below.

When the sampling period extending from the point at which the steering wheel 1 is steered at or above the predetermined speed to the point at which the steering wheel 1 returns to the neutral position is short, the integrated value of the input torque within the sampling period may fall to or below the reference integrated torque even though the torque sensor 12 is normal, and as a result, with the determination method described in the first embodiment, the torque sensor 12 may be determined to be abnormal. Therefore, setting the reference integrated torque serving as the determination reference at a smaller value may be considered.

Here, when the first and second cables 21, 22 of the torque sensor 12 are disconnected or the connectors of the first and second cables 21, 22 are detached, the output voltage of the torque sensor 12 should reach 2.5 V, as described above. Due to individual differences and variation over time in the torque sensor 12, however, the actual output voltage of the torque sensor 12 may take a slightly larger value than 2.5 V. The deviation in the output voltage caused by individual differences and variation over time in the torque sensor 12 is slight and not large enough to cause the difference between the output voltage output from the main system and the output voltage output from the sub-system to equal or exceed the allowable difference such that the torque sensor 12 is determined to be abnormal. Therefore, when this type of deviation occurs and a determination is performed using the method of the first embodiment after setting the reference integrated torque at a smaller value, the integrated value of the input torque may become larger than the reference integrated value even though the torque sensor 12 is abnormal, and as a result, the torque sensor 12 may be determined to be normal.

In light of these circumstances, the reference integrated torque cannot be set at a smaller value, and therefore, as described above, when the sampling period is short, it may be impossible to determine the condition of the torque sensor 12 accurately using the determination method according to the first embodiment. Hence, in the second embodiment, following procedures are performed in addition to the determination method of the first embodiment.

Figure 7:
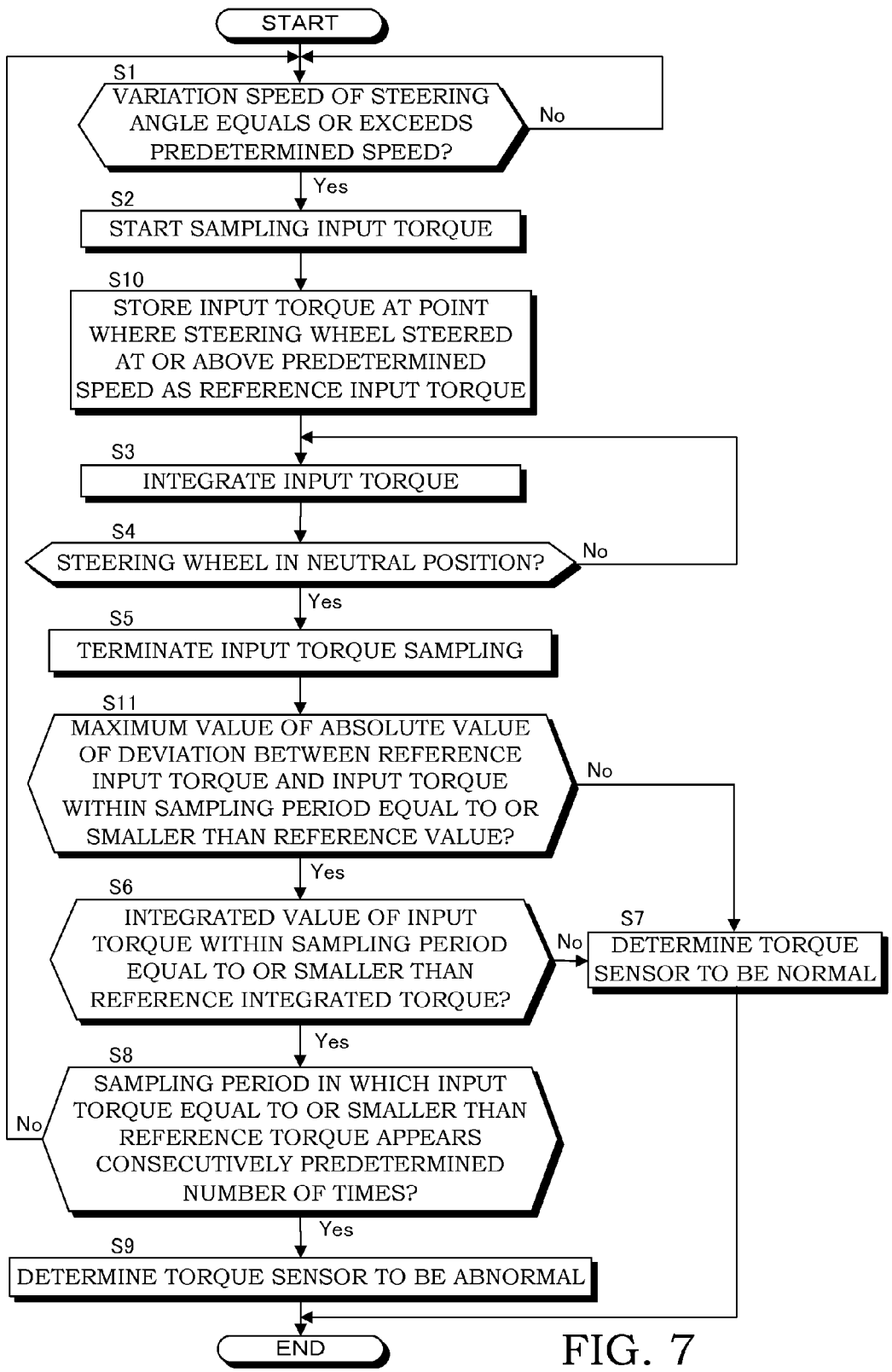
FIG. 7 is a flowchart showing procedures executed by the controller to determine an abnormality in the torque sensor according to a second embodiment.

As shown in FIG. 7, in the second embodiment, a step 10 is performed between the steps 2 and 3 of the first embodiment, and a step 11 is performed between the steps 5 and 6. All other steps are identical to the first embodiment.

In the step 10, the input torque at the point within the sampling period where the steering wheel 1 is steered at or above the predetermined speed is stored as a reference input torque. More specifically, the input torque at the point where the variation speed of the steering angle of the steering wheel 1 is determined in the step 1 to equal or exceed the predetermined speed is stored as the reference input torque. In FIG. 5, the reference input torque is T-base.

In the step 11, a maximum value of an absolute value of a deviation between the reference input torque and the input torque detected by the torque sensor 12 in the sampling period is calculated. This corresponds to a maximum value calculation step executed by a maximum value calculation unit of the controller 13. A determination is then made as to whether or not the calculated maximum value is equal to or smaller than a predetermined reference value. When it is determined in the step 11 that the maximum value exceeds the reference value, it may be said that the torque sensor 12 is able to detect the input torque normally, and therefore the routine advances to the step 7, where the torque sensor 12 is determined to be normal. The reference value used in the determination of the step 11 is set at a value at which an abnormality in the torque sensor 12 can be determined. For example, a value obtained by adding a margin to a tolerance used by the controller 13 to determine that the steering wheel 1 is in the neutral position is set as the reference value. The reference value is at least set at a larger value than a torque value corresponding to maximum amount of envisaged deviation in the output voltage of the torque sensor 12.

When the sampling period is short, using the step 6 alone, the torque sensor 12 may be determined to be abnormal despite being normal, and as a result, it may be impossible to determine the condition of the torque sensor 12 accurately. By executing the step 11 before the step 6, however, this type of erroneous determination can be prevented.

When it is determined in the step 11 that the maximum value is equal to or smaller than the reference value, this may indicate that the torque sensor 12 is not able to detect the input torque normally, and therefore the routine advances to the step 6, where a determination is made as to whether or not the integrated value of the input torque in the sampling period is equal to or smaller than the reference integrated torque. When it is determined in the step 6 that the integrated value of the input torque is equal to or smaller than the reference integrated torque, this indicates an abnormal condition in which the input torque input into the steering shaft 2 cannot be detected, and therefore the routine advances to the step 8. Hence, in the second embodiment, when the maximum value is determined to be equal to or smaller than the reference value in the step 11 and the integrated value of the input torque is determined to be equal to or smaller than the reference integrated torque in the step 6, an abnormality is determined to have occurred in the torque sensor 12.

When the steering wheel 1 is steered slowly, it may be determined in the step 11 that the maximum value is equal to or smaller than the reference value even though the torque sensor 12 is normal. In this case, however, the sampling period lengthens such that the integrated value of the input torque increases, and therefore the integrated value of the input torque is determined to exceed the reference integrated torque in the step 6. Accordingly, the routine advances to the step 7, where the torque sensor 12 is determined to be normal.

As described above, by adding the steps 10 and 11 to the determination method of the first embodiment, a torque sensor abnormality can be diagnosed with an even higher degree of precision.

The second embodiment may also be applied to a case in which the period extending from the point at which the steering wheel 1 is steered at or above the predetermined speed to the point at which the predetermined time elapses is set as the sampling period (the case shown in FIG. 6).

Embodiments of this invention were described above, but the above embodiments are merely examples of applications of this invention, and the technical scope of this invention is not limited to the specific constitutions of the above embodiments.

This application claims priority based on Japanese Patent Application No. 2012-56388 filed with the Japan Patent Office on Mar. 13, 2012 and Japanese Patent Application No. 2013-13160 filed with the Japan Patent Office on Jan. 28, 2013, the entire contents of which are incorporated into this specification.

INDUSTRIAL APPLICABILITY

The present invention can be applied to an abnormality diagnosis apparatus for a torque sensor used in an electric power steering apparatus.

The invention claimed is:

1. An abnormality diagnosis apparatus for diagnosing an abnormality in a torque sensor that is connected to a controller of an electric power steering apparatus by two systems, comprising:
   a steering speed determination unit that determines whether or not a variation speed of a steering angle of a steering wheel equals or exceeds a predetermined speed on the basis of a detection result from a steering angle sensor that detects the steering angle of the steering wheel;
   an integrated value calculation unit that calculates an integrated value of an input torque detected by the torque sensor within a sampling period extending from a point at which the steering wheel is steered at or above the predetermined speed to a point at which the steering wheel returns to a neutral position; and
   an abnormality determination unit that determines that an abnormality has occurred in the torque sensor when the integrated value of the input torque, calculated by the integrated value calculation unit, is equal to or smaller than a predetermined reference integrated torque.

2. The abnormality diagnosis apparatus for a torque sensor as defined in claim 1, further comprising a maximum value calculation unit that calculates a maximum value, within the sampling period, of an absolute value of a deviation between a reference input torque, which is an input torque at the point where the steering wheel is steered at or above the predetermined speed, and the input torque detected by the torque sensor,
   wherein the abnormality determination unit determines that an abnormality has occurred in the torque sensor when the maximum value calculated by the maximum value calculation unit is equal to or smaller than a predetermined reference value and the integrated value of the input torque, calculated by the integrated value calculation unit, is equal to or smaller than the reference integrated torque.

3. The abnormality diagnosis apparatus for a torque sensor as defined in claim 1, wherein the integrated value calculation unit determines that the steering wheel has returned to the neutral position when a symbol of the steering angle of the steering wheel, detected by the steering angle sensor, changes, and then calculates the integrated value of the input torque in the sampling period.

4. An abnormality diagnosis apparatus for diagnosing an abnormality in a torque sensor that is connected to a controller of an electric power steering apparatus by two systems, comprising:
   a steering speed determination unit that determines whether or not a variation speed of a steering angle of a steering wheel equals or exceeds a predetermined speed on the basis of a detection result from a steering angle sensor that detects the steering angle of the steering wheel;
   an integrated value calculation unit that calculates an integrated value of an input torque detected by the torque sensor within a sampling period extending from a point at which the steering wheel is steered at or above the predetermined speed to a point at which a predetermined time elapses;
   a maximum value calculation unit that calculates a maximum value, within the sampling period, of an absolute value of a deviation between a reference input torque, which is an input torque at the point where the steering wheel is steered at or above the predetermined speed, and the input torque detected by the torque sensor; and
   an abnormality determination unit that determines that an abnormality has occurred in the torque sensor when the maximum value calculated by the maximum value calculation unit is equal to or smaller than a predetermined reference value and the integrated value of the input torque, calculated by the integrated value calculation unit, is equal to or smaller than a predetermined reference integrated torque.

5. The abnormality diagnosis apparatus for a torque sensor as defined in claim 4, wherein the abnormality determination unit determines that an abnormality has occurred in the torque sensor when a sampling period in which the integrated value of the input torque is equal to or smaller than the reference integrated torque appears consecutively a predetermined number of times.

6. The abnormality diagnosis apparatus for a torque sensor as defined in claim 1, wherein the abnormality determination unit determines that an abnormality has occurred in the torque sensor when a sampling period in which the integrated value of the input torque is equal to or smaller than the reference integrated torque appears consecutively a predetermined number of times.

7. An abnormality diagnosis method for diagnosing an abnormality in a torque sensor that is connected to a controller of an electric power steering apparatus by two systems, comprising:
- a steering speed determination step for determining whether or not a variation speed of a steering angle of a steering wheel equals or exceeds a predetermined speed on the basis of a detection result from a steering angle sensor that detects the steering angle of the steering wheel;
- an integrated value calculation step for calculating an integrated value of an input torque detected by the torque sensor within a sampling period extending from a point at which the steering wheel is steered at or above the predetermined speed to a point at which the steering wheel returns to a neutral position; and
- an abnormality determination step for determining that an abnormality has occurred in the torque sensor when the integrated value of the input torque, calculated in the integrated value calculation step, is equal to or smaller than a predetermined reference integrated torque.

8. The abnormality diagnosis method for a torque sensor as defined in claim 7, further comprising a maximum value calculation step for calculating a maximum value, with the sampling period, of an absolute value of a deviation between a reference input torque, which is an input torque at the point where the steering wheel is steered at or above the predetermined speed, and the input torque detected by the torque sensor,
- wherein, in the abnormality determination step, an abnormality is determined to have occurred in the torque sensor when the maximum value calculated in the maximum value calculation step is equal to or smaller than a predetermined reference value and the integrated value of the input torque, calculated in the integrated value calculation step, is equal to or smaller than the reference integrated torque.

9. An abnormality diagnosis method for diagnosing an abnormality in a torque sensor that is connected to a controller of an electric power steering apparatus by two systems, comprising:
- a steering speed determination step for determining whether or not a variation speed of a steering angle of a steering wheel equals or exceeds a predetermined speed on the basis of a detection result from a steering angle sensor that detects the steering angle of the steering wheel;
- an integrated value calculation step for calculating an integrated value of an input torque detected by the torque sensor within a sampling period extending from a point at which the steering wheel is steered at or above the predetermined speed to a point at which a predetermined time elapses;
- a maximum value calculation step for calculating a maximum value, within the sampling period, of an absolute value of a deviation between a reference input torque, which is an input torque at the point where the steering wheel is steered at or above the predetermined speed, and the input torque detected by the torque sensor; and
- an abnormality determination step for determining that an abnormality has occurred in the torque sensor when the maximum value calculated in the maximum value calculation step is equal to or smaller than a predetermined reference value and the integrated value of the input torque, calculated in the integrated value calculation step, is equal to or smaller than a predetermined reference integrated torque.

* * * * *